United States Patent [19]

Anderson

[11] Patent Number: 4,547,661
[45] Date of Patent: Oct. 15, 1985

[54] KEY CARD RECEIVER

[75] Inventor: Eric G. Anderson, Rochester, Mich.

[73] Assignee: Rockwell International Corporation, Pittsburgh, Pa.

[21] Appl. No.: 496,042

[22] Filed: May 19, 1983

[51] Int. Cl.[4] .............................................. G06K 13/00
[52] U.S. Cl. .................................... 235/482; 235/483; 235/485
[58] Field of Search ............... 235/482, 483, 475, 479, 235/485

[56] References Cited

U.S. PATENT DOCUMENTS 3,953,712  4/1976  Horvath ............................. 235/482
4,443,693  5/1984  Berezowski ......................... 235/483
4,480,180 10/1984  Fisher ................................ 235/482

Primary Examiner—Harold I. Pitts

[57] ABSTRACT

A key card receiver has a key card slideway facial insert and upper and lower body halves. The insert has a tapered guideway and a flat slideway with opposite parallel walls and side walls which extend perpendicularly from the guideway walls. Abutments are connected to the side walls, and the abutments include elongated hooks which extend around pedestals of the upper and lower body halves and lugs which extend into recesses in a jack in the lower body half. The upper and lower body halves are joined together by pedestals which have complementary knobs and depressions. Larger pedestals have aligned openings for mounting. A front vestibule formed between the body halves receives the key card slideway insert, and a rear chamber provides space for mounting an electronic circuit for converting identification data on the card to a pulse train.

9 Claims, 5 Drawing Figures

KEY CARD RECEIVER

BACKGROUND OF THE INVENTION

Key card receivers are widely used to receive key cards which are partially or fully slid into the receiver. Identification or data is read from the card before the card is withdrawn.

A problem exists in constructing key card receivers in that often only minimal space is provided for the receiver. The receiver must be sturdy for repeated use and for accuracy in reading identification or data from the card.

At this same time, the receivers must have adequate space for receiving the card and holding electronic circuitry to read information from the card.

SUMMARY OF THE INVENTION

The invention overcomes problems existing in the prior art and constructs a sturdy and compact card receiver with three parts which interconnect and rigidify each other and which can be readily formed with conventional processes.

A preferred key card receiver apparatus has a key car slideway front insert, a first body half and a second opposite complementary body half. First front vestibule means in the first body half and second complementary front vestibule means in the second body half receive the key card slideway insert. A first rear chamber in the first body half and a second complementary rear chamber in the second body half form a body chamber for holding an electronic reading circuit. Preferably, the first and second body halves include complementary opposite projections and recesses. In the preferred embodiments the recesses and projections are on pedestals which extend towards the opposite body halves.

First and second mounting means are aligned in the first and second halves. In the preferred embodiments, the first and second mounting means are formed with first and second mounting pedestals mounted within the halves and extend toward the opposite halves. Aligned bores extend through the pedestals.

A preferred key card slideway insert has a front face which abuts ends of the first and second body halves. A tapered guideway extends inward from the body face, and a flat slideway extends inward from the guideway. The key card slideway insert further has parallel walls on opposite sides of the slideway extending generally perpendicular to the slideway. Abutments are connected to the parallel walls and extend generally outward therefrom. Preferred abutments include hooks for partially surrounding pedestals extending inward from the first and second body halves.

The abutments further include projections. A jack mounted on one body half has a recess for receiving the projections on the key card slideway insert. Preferably, the abutment has a wall facing toward the rear chamber and the projections are on the wall. A jack has an open end for receiving an end of a key card and has an opposite end with corner portions for receiving pedestals in the first body half. Recesses adjacent the open end of the jack receive projections on the slideway rearward facing walls, whereby the projections and the rearward facing walls hold the corner portions and the jack against the pedestal.

DETAILED DESCRIPTION OF THE DRAWINGS

Figure 1:
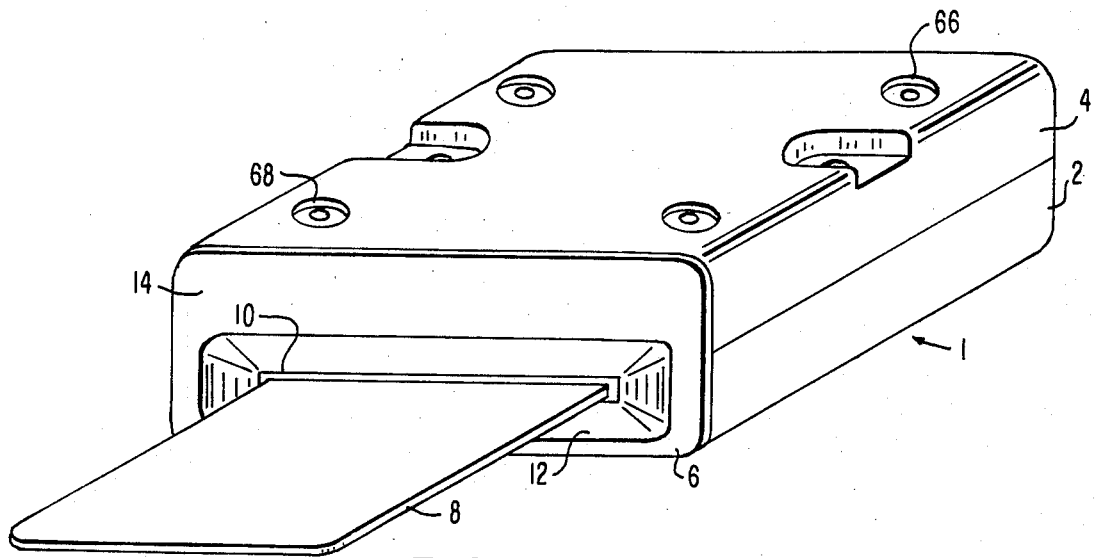
FIG. 1 is a perspective view of a card receiver of the present invention.

Referring to FIG. 1, a key card receiver is generally indicated by the numeral 1. The receiver preferably is made of a lower body half 2, an upper body half 4 with a key card receiver insert 6 as a frontal piece.

As shown in FIG. 1, a key card 8 is partially slid into an opening 10 in the receiver. The slideway opening 10 is surrounded by a tapered guideway 12 which leads inward from the face 14 of insert 6. The guideway 12 centers the card 8 as it is inserted in the receiver and directs the card toward the slideway opening 10.

Figure 2:
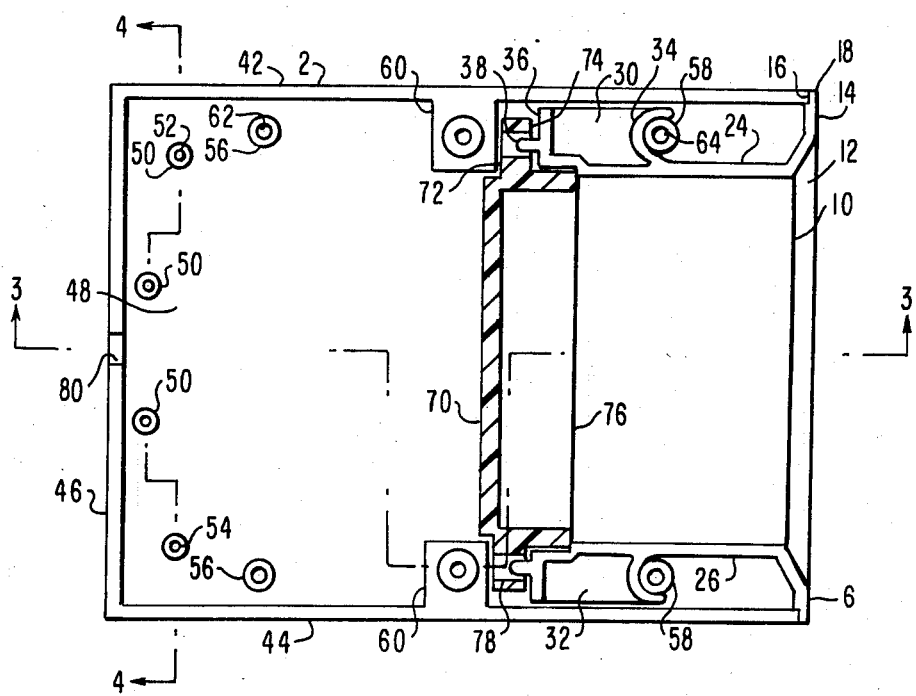
FIG. 2 is a partially assembled detail showing the interfitting of the key card slideway insert and the lower body half.

As shown in FIG. 2, the lower body 2 has a front edge which abuts a recess 16 in the edge 18 of insert 6. The recess 16 extends around the edge 18 and aids in holding the insert precisely centered between the body halves.

Figure 3:
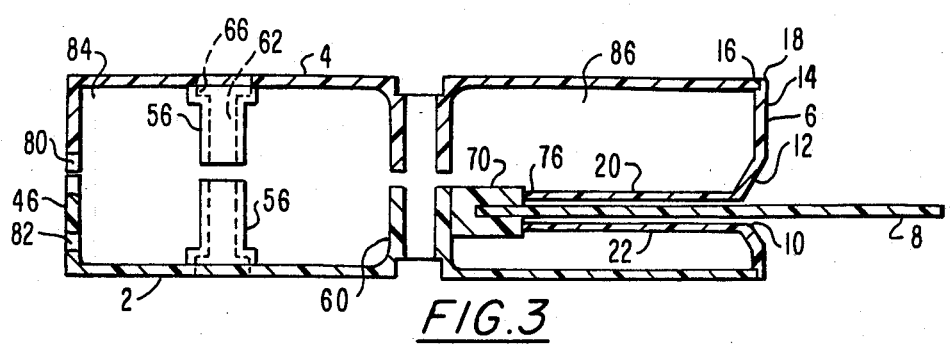
FIG. 3 is a cross-sectional detail taken along line 3—3 of FIG. 2.
Figure 4:
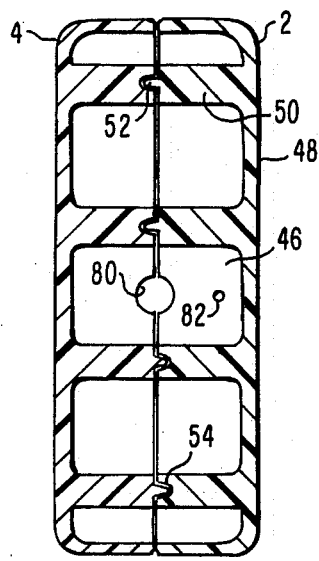
FIG. 4 is a cross-sectional detail taken along line 4—4 of FIG. 2.
Figure 5:
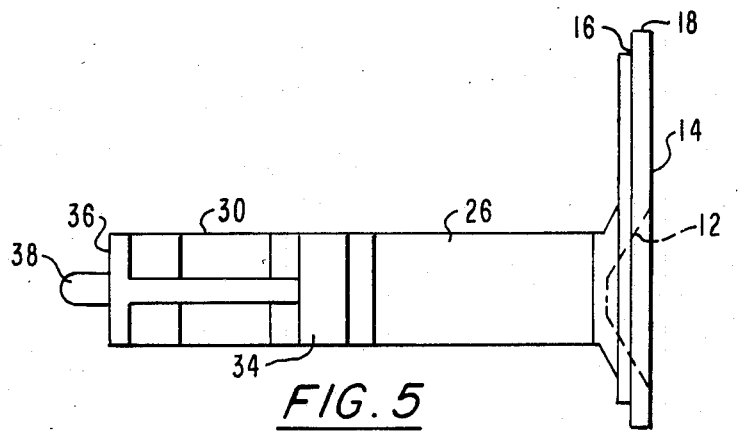
FIG. 5 is a side elevation of the key card slideway insert.

Upper and lower flat slideway walls 20 and 22, as shown in FIG. 3, are bordered by perpendicular side walls 24 and 26 which extend perpendicular to the walls 20 and 22 of the slideway. Abutment means 30 and 32 include elongated hooks 34, walls 36 and tongues 38 which fit in jack recesses, as later described.

The lower body half 2 has side walls 42 and 44, a rear wall 46 and a bottom wall 48. Pedestals 50 near the rear wall 46 have knobs 52 or holes 54 which cooperate with complementary holes and knobs on pedestals of the opposite body half.

Mounting pedestals 56, 58 and 60 have openings therethrough for receiving mounting bolts. The forward pedestals 58 receive the hooks 34 of the slideway insert. The hooks 34 and the notches 16 longitudinally fix the slideway insert with respect to the body half. Bores 62 and 64 in the mounting pedestals 56 and 58 are countersunk, 66 and 68, to receive fasteners, as shown in FIGS. 1 and 3.

As shown in FIG. 2, jack 70 is held in place against central pedestals 60 by projections 38 on rear walls 36 of the slideway insert 6. Rear corners 72 of the jack 70 are held against the pedestal 60 by abutment of wall 36 with front walls 74 of the jack.

Jack 70 has inward facing contacts (not shown) which are complementary to outward facing contacts on the end of card 8. The forward facing end 76 of jack 70 is open to receive the end of the card.

Jack 70 may have either downward facing contacts or upward facing contacts or both. Conductors similarly connect the contacts to a circuit which converts the simultaneous information received by the contacts to pulse trains.

As shown in FIG. 3, the upper housing half 4 is identical to the lower housing half 2 so that the parts are interchangeable and may be made in the same die.

A hole 80 is formed by semicircular openings between the halves in the rear wall 46. A separate hole 82 is subsequently formed in one of the halves. The two halves provide a rearward chamber 84 for holding electronic circuits and a forward vestibule 86 for holding the key card slideway insert 6.

The elements are assembled by placing the jack 70 on the key card slideway insert 6, by placing recesses 78 on lugs 38. Then, the assembled jack 70 and slideway insert 6 are slid down into lower body half 2 with the hooks 34 behind the pedestals 58 and forward edges of the side walls of the body insert engaging grooves 16 in edge 18 of the insert 6. Jack 70 is trapped between the insert 6 and the forward walls of central pedestals 60. The electronic circuit is added in the chamber 84 and its communication wire is fed through the partially formed hole 80 in the rear wall 46. The upper half 4 is placed over the lower half, and the sections are bolted together with four fasteners which extend through bores 62 and 64. The receiver is mounted in an appropriate position, for example, in a vehicle, and it is ready to receive a card 8.

While the invention has been described with reference to a specific embodiment, modifications and variations of the invention may be constructed without departing from the scope of the invention.

I claim:

1. A key card receiver apparatus comprising:
   (a) a first body half defining first front vestibule means, a first rear chamber and having a first plurality of mounting pedestals;
   (b) a second, opposite complementary body half defining a second, complementary vestibule means, a second complementary rear chamber, and having a second plurality of mounting pedestals such that when assembled the body halves define a front vestibule, a rear chamber and the first and second mounting pedestals are in alignment with each other;
   (c) a key card receiver insert defining a key card slideway;
   (d) mounting means attached to the key card receiver insert contacting a plurality of the mounting pedestals for fixedly mounting the key card receiver insert in the front vestibule; and
   (e) electronic reading circuit means mounted in the rear chamber.

2. The apparatus of claim 1 wherein the first and second body halves include complementary opposite projections and recesses, respectively of the first and second body halves.

3. The apparatus of claim 2 wherein the recesses and projections are on pedestals which extend toward the opposite body halves.

4. The apparatus of claim 3 wherein the first and second mounting pedestals are located within the body halves, extending toward the opposite halves, and further define aligned bores extending through the pedestals.

5. The apparatus of claim 1 wherein the key card slideway insert comprises a front face which abuts ends of the first and second body halves, a tapered guideway extending inward from the front face and a flat slideway extending inward from the guideway.

6. The apparatus of claim 5 wherein the key card slideway insert further comprises parallel walls on opposite sides of the slideway extending generally perpendicular to the slideway and wherein the mounting means is connected to the parallel walls and extends generally outward therefrom.

7. The apparatus of claim 6 wherein the mounting means comprises hook means for partially surrounding mounting pedestals extending inward from the first and second body halves.

8. The apparatus of claim 7 wherein the mounting means further comprises a wall facing toward the rear chamber and a projection on the wall.

9. The apparatus of claim 1 further comprising a jack having an open end for receiving an end of a card and having an opposite end with recessed corner portions for receiving a mounting pedestal of the first body half and having recesses adjacent the open and for receiving a projection on a rearward facing wall of the key card receiver insert whereby the projection and the rearward facing wall hold the corner portion and the jack against the mounting pedestal.

* * * * *